United States Patent
Gondoh et al.

(10) Patent No.: US 11,629,017 B2
(45) Date of Patent: Apr. 18, 2023

(54) PICKING FACILITY

(71) Applicant: Daifuku Co., Ltd., Osaka (JP)

(72) Inventors: Takuya Gondoh, Tokyo (JP); Masami Iwai, Tokyo (JP); Atsushi Minoo, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 405 days.

(21) Appl. No.: 17/049,655

(22) PCT Filed: Apr. 15, 2019

(86) PCT No.: PCT/JP2019/016110
§ 371 (c)(1),
(2) Date: Oct. 22, 2020

(87) PCT Pub. No.: WO2019/208292
PCT Pub. Date: Oct. 31, 2019

(65) Prior Publication Data
US 2021/0253375 A1    Aug. 19, 2021

(30) Foreign Application Priority Data
Apr. 27, 2018    (JP) .............................. JP2018-087160

(51) Int. Cl.
*B65G 59/04*    (2006.01)
*B65G 61/00*    (2006.01)
(Continued)

(52) U.S. Cl.
CPC .............. *B65G 61/00* (2013.01); *B65G 1/137* (2013.01); *B65G 59/04* (2013.01); *B65G 60/00* (2013.01);
(Continued)

(58) Field of Classification Search
CPC .......... B65G 65/005; B65G 2814/0302; B65G 57/04; B65G 47/24; B65G 47/244;
(Continued)

(56) References Cited

U.S. PATENT DOCUMENTS 4,692,876 A * 9/1987 Tenma ................... G06Q 10/08
                                                          901/7
4,835,450 A * 5/1989 Suzuki .................. G06T 1/0014
                                                         414/730
(Continued)

FOREIGN PATENT DOCUMENTS

JP    201543175 A    3/2015
JP    201797847 A    6/2017

*Primary Examiner* — Gregory W Adams
(74) *Attorney, Agent, or Firm* — The Webb Law Firm

(57) ABSTRACT

A picking facility is realized that can shorten the time required to transfer an article from a first support body to a second support body. Of a plurality of articles 50 supported by the first support body 51, the article 50 located at the highest position and the article 50 whose upper face T1 is present in a range of a set distance D downward from the upper face T1 of the article 50 located at the highest position are set as transfer-target articles 50A, and the control device performs a selection control to preferentially select, from the transfer-target articles 50A, a transfer-target article 50A in the normal orientation SC, and a transfer control to control the transfer device so as to transfer the transfer-target article 50A selected through the selection control from the first support body 51 to the second support body.

11 Claims, 7 Drawing Sheets

(51) Int. Cl.
  *B65G 1/137* (2006.01)
  *B65G 60/00* (2006.01)
(52) U.S. Cl.
  CPC ............... *B65G 2203/0233* (2013.01); *B65G 2203/041* (2013.01); *B65G 2814/0305* (2013.01); *B65G 2814/0308* (2013.01)
(58) Field of Classification Search
  CPC .. B65G 47/248; B65G 47/256; B65G 1/0421; B65G 1/1378; B65G 2203/0225; B25J 9/1697; B25J 9/1612
  USPC ................................................. 700/214–218
  See application file for complete search history.

(56) References Cited

U.S. PATENT DOCUMENTS

| | | | | |
|---|---|---|---|---|
| 5,175,692 A | * | 12/1992 | Mazouz | B65G 61/00 901/7 |
| 5,203,671 A | * | 4/1993 | Cawley | B65B 11/008 414/792.9 |
| 5,501,571 A | * | 3/1996 | Van Durrett | B65G 61/00 414/21 |
| 7,210,894 B2 | * | 5/2007 | Huang | B65G 47/905 414/21 |
| 8,489,229 B2 | * | 7/2013 | Kuehnemann | G06Q 10/08 700/214 |
| 10,106,340 B2 | * | 10/2018 | Gondoh | B65G 57/22 |
| 2013/0282165 A1 | * | 10/2013 | Pankratov | G05B 15/02 700/217 |
| 2014/0277694 A1 | * | 9/2014 | Ichimaru | B25J 9/1612 700/218 |
| 2016/0096643 A1 | * | 4/2016 | Baylor | B65B 35/18 53/443 |
| 2016/0229061 A1 | * | 8/2016 | Takizawa | G05B 15/02 |
| 2018/0065818 A1 | | 3/2018 | Gondoh et al. | |
| 2018/0065819 A1 | * | 3/2018 | Gondoh | B65G 57/22 |

\* cited by examiner

PICKING FACILITY

CROSS-REFERENCE TO RELATED APPLICATIONS

This application is the United States national phase of International Application No. PCT/JP2019/016110 filed Apr. 15, 2019, and claims priority to Japanese Patent Application No. 2018-087160 filed Apr. 27, 2018, the disclosures of which are hereby incorporated by reference in their entirety.

TECHNICAL FIELD

The present invention relates to a picking facility that includes a transfer device for transferring an article from a first support body to a second support body, an image capture device for capturing, from above, an image of the article placed on the first support body, and a control device for controlling the transfer device.

BACKGROUND ART

A conventional example of a picking facility is described in JP 2015-043175A (Patent Document 1). The picking facility in Patent Document 1 uses a container 51 and an article transport conveyor 11 as first and second support bodies, respectively, and a picking robot 5 transfers articles from the container 51 to the article transport conveyor 11. Ordinarily, the container 51 accommodates article 50 in a normal orientation SC, but the articles 50 in the container 51 fall down due to swinging or vibration occurring when the container 51 is transported by a stacker crane 13B or the like, and the orientation of the articles 50 accommodated in the container 51 becomes an overturned long orientation SA or an overturned short orientation SB in some cases.

SUMMARY OF THE INVENTION

In the picking facility in Patent Document 1, an article 50 placed on the first support body in the normal orientation SC is transferred to the second support body while remaining in the normal orientation SC. Also, an article 50 in the overturned long orientation SA on the first support body is transferred to the second support body while remaining in the overturned long orientation SA, and an article 50 in the overturned short orientation SB on the first support body is transferred to the second support body while remaining in the overturned short orientation SB.

Here, it is desirable, in some cases, to transfer articles in the normal orientation SC to the second support body. In such cases, the orientation of an article that is in the overturned long orientation SA or the overturned short orientation SB on the first support body needs to be changed to the normal orientation by the picking robot 5 re-gripping the article in a different manner, for example, and thereafter this article in the normal orientation needs to be transferred to the second support body. If a large number of articles need to be subjected to such an orientation change, it may take a long time overall when a plurality of articles are transferred from the first support body to the second support body.

Also, in the case where an upper face of an article in the normal orientation SC is smaller than a side face thereof, if the upper face of this article in the overturned long orientation SA or the overturned short orientation SB is to be held by a holding portion, an error is more likely to occur when holding the upper face, which is relatively narrow. In addition, in the case where the height of an article in the overturned long orientation SA or the overturned short orientation SB is higher than the height of the article in the normal orientation SC, if an upper face of the article in the overturned long orientation SA or the overturned short orientation SB is held by the holding portion, the distance from the position at which the holding portion holds the upper face to the center of gravity of the article is more likely to be long, and the holding state of the article during a transfer operation is more likely to be unstable. For this reason, it is difficult to increase the speed of the transfer operation. Accordingly, in such cases as well, it often takes a long time overall when a plurality of articles are transferred from the first support body to the second support body.

It is therefore desired to realize a picking facility capable of shortening the time required to transfer a plurality of articles from the first support body to the second support body.

In view of the foregoing, a picking facility includes: a transfer device for transferring an article from a first support body to a second support body; an image capture device for capturing, from above, an image of the article placed on the first support body; and a control device for controlling the transfer device, the transfer device including a holding portion for holding an upper portion of the article, wherein the control device performs height determination to determine a height of the article placed on the first support body, and orientation determination to determine whether or not an orientation of the article placed on the first support body is a normal orientation, based on image capture information from the image capture device, of a plurality of the articles supported by the first support body, the article located at a highest position and the article whose upper face is present in a range of a set distance downward from an upper face of the article located at the highest position are set as transfer-target articles, and the control device performs a selection control to preferentially select, from the transfer-target articles, a transfer-target article in the normal orientation, and a transfer control to control the transfer device so as to transfer the transfer-target article selected through the selection control from the first support body to the second support body.

According to this configuration, if articles to be transferred include an article in the normal orientation and an article in an orientation other than the normal orientation, the article in the normal orientation is preferentially selected and transferred from the first support body to the second support body. That is to say, even if the upper face of the article in the normal orientation of the articles to be transferred is lower than the upper face of the article in an orientation other than the normal orientation, the article in the normal orientation is preferentially selected through the selection control, and is transferred to the second support body through the transfer control.

As a result, in the case where articles need to be transferred in the normal orientation to the second support body, the ratio of articles whose orientation is changed can be reduced compared with the case of simply preferentially selecting an article with the highest upper face and transferring this article to the second support body. It is therefore possible to shorten the time required to transfer a plurality of articles from the first support body to the second support body. Further, in the case where the upper face of an article is held by the holding portion, and the normal orientation is set such that the upper face is larger than the side face, the article can be stably held by holding the upper face of the article that is relatively large, and it is possible to reduce the likelihood that an error occurs when the article is held by the holding portion. Furthermore, in the case where the height of an article in the normal orientation is made lower than the height of an article in the overturned long orientation or the overturned short orientation, and the article in the normal orientation is to be held, the holding state of the article during the transfer operation can be readily stabilized and the speed of the transfer operation can be readily increased since the distance from the position at which the article is held by the holding portion to the center of gravity of the article is shorter than that in the case of holding the article in the overturned long orientation or the overturned short orientation that is an orientation in which the article is vertically longer than that in the normal orientation. Accordingly, the time required to transfer a plurality of articles from the first support body to the second support body can be shortened.

DESCRIPTION OF THE INVENTION

1. Embodiment

An embodiment of a picking facility will be described based on the drawings.

Figure 4:
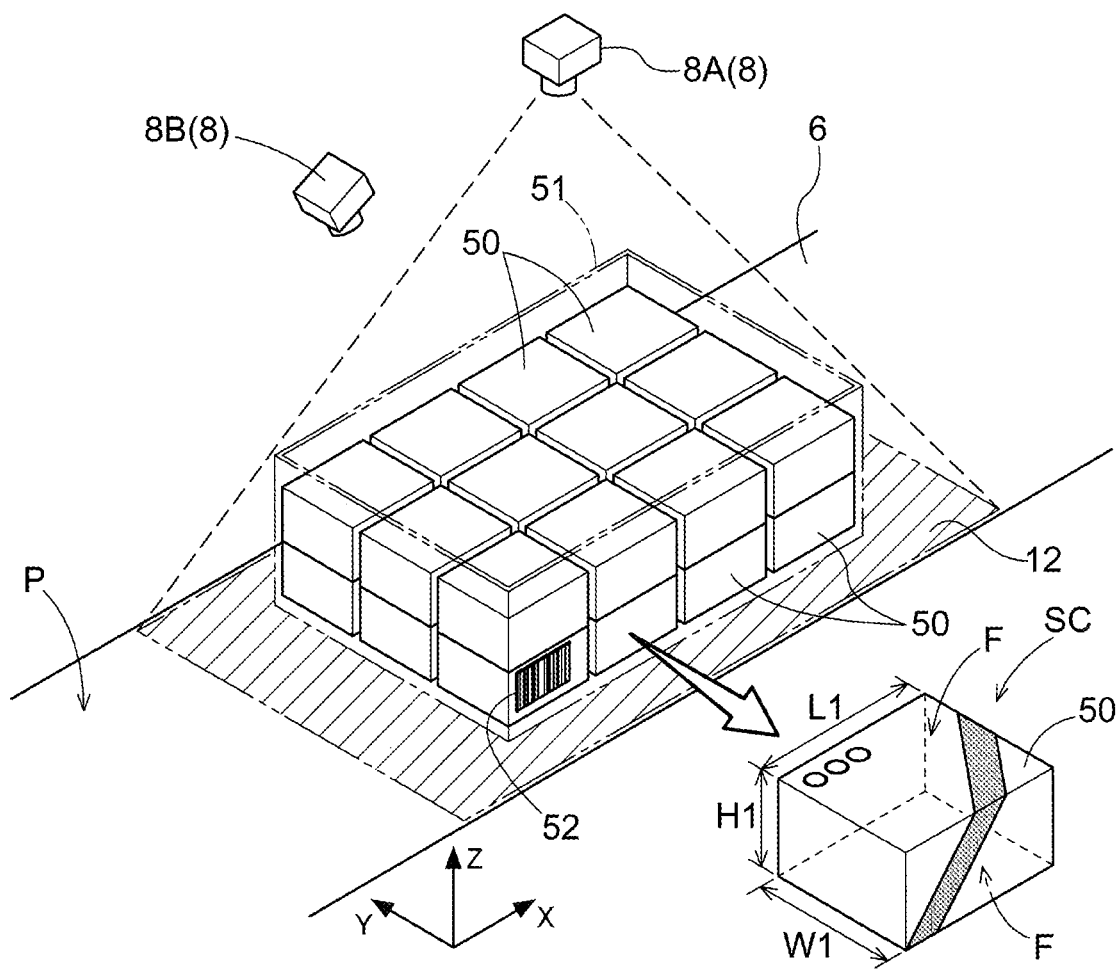
FIG. 4 is a perspective view of a container and articles according to the embodiment of the present invention.

Note that, in the following embodiment, a first container 51 is formed to have a rectangular shape as viewed in a plan view, as will be described later. As shown in FIG. 4, the direction in which a first side of the first container 51 extends is an in-container length direction X, the direction in which a second side extends and that is perpendicular to the in-vehicle length direction X is an in-container width direction Y, and the direction perpendicular to the in-vehicle length direction X and the in-vehicle width direction Y is a height direction Z. Note that the height direction Z corresponds to the vertical direction.

Picking Facility

Figure 1:
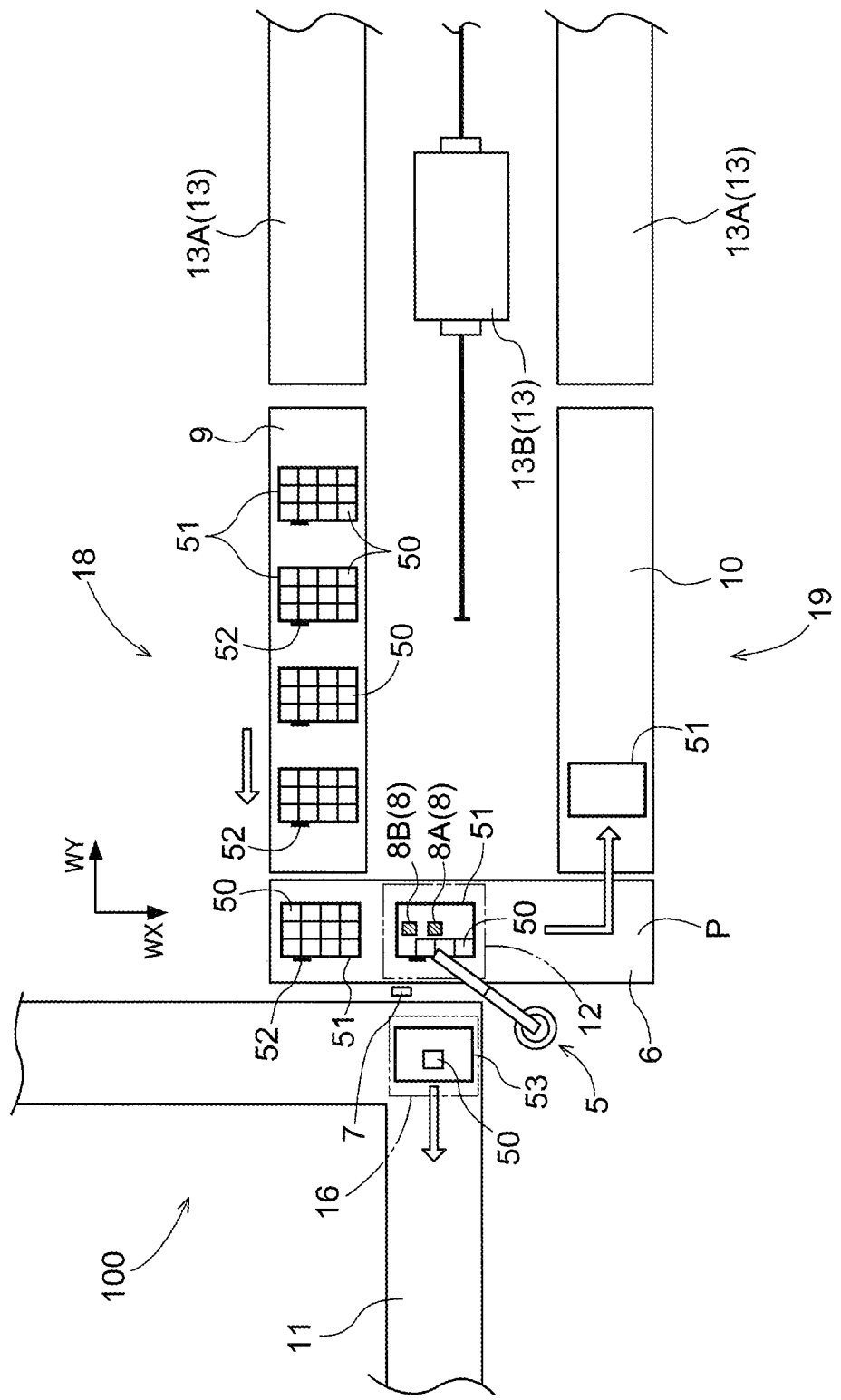
FIG. 1 is a schematic configuration diagram of a picking facility according to an embodiment of the present invention.

As shown in FIG. 1, a picking facility 100 includes a picking robot 5, a picking conveyor 6, a bar code reader 7, an image capture device 8, an unloading conveyor 9, a loading conveyor 10, a container transport conveyor 11, and an automated warehouse 13. In the picking facility 100, first, a first container 51 in which articles 50 corresponding to an order are stored is taken out from the automated warehouse 13, based on the order regarding the articles 50 to be unloaded, the number of articles 50 to be unloaded, and so on. Then, the picking facility 100 transports the first container 51 that has been taken out to a picking area 12 by the unloading conveyor 9 and the picking conveyor 6. Also, the picking facility 100 transports an empty second container 53 to an accommodating area 16 by the container transport conveyor 11. With the first container 51 located in the picking area 12 and the second container 53 located in the accommodating area 16, the articles 50 are taken out from the first container 51 by the picking robot 5, and the articles 50 that have been taken out are transferred from the first container 51 to the second container 53 so as to accommodate the articles 50 into the second container 53. Then, the first container 51 from which the articles 50 to be taken out have been taken out is returned to the automated warehouse 13 by the picking conveyor 6 and the loading conveyor 10. The second container 53 into which the articles 50 to be accommodated have been accommodated is transported from the accommodating area 16 by the container transport conveyor 11. Note that the first container 51 corresponds to a first support body, and the second container 53 corresponds to a second support body. Also, the picking area 12 corresponds to a transfer position.

The bar code reader 7 is for contactlessly (e.g. optically) reading a bar code 52 (see FIG. 4) attached to an outer side face of the first container 51. In the present embodiment, the bar code reader 7 is provided in the picking area 12. The bar code 52 includes ID information unique to the first container 51, and the bar code reader 7 outputs the ID information unique to the first container 51 included in the read bar code 52 to a later-described host controller 2.

The image capture device 8 is a device (e.g. a stereo camera) capable of recording information representing the distance from an object whose image has been captured to the image capture device 8. The image capture device 8 captures, from above, an image of an article 50 accommodated in (placed on) the first container 51 that has been transported to the picking area 12. In the present embodiment, the image capture device 8 includes a first camera 8A and a second camera 8B, as shown in FIG. 4. The first camera 8A is provided at a position with a known height from a transport surface P that is immediately above the central position of the picking area 12, and captures an image of the entire picking area 12 in a planar manner. The second camera 8B is provided above a position slightly shifted from the central position of the picking area 12, and captures an image of the entire picking area 12 obliquely from above. Then, the image capture device 8 calculates information representing the distance from the first camera 8A at each pixel of the image captured by the first camera 8A, based on a parallax between the first camera 8A and the second camera 8B, and generates a captured image (image capture information) in which each pixel has information regarding the distance from the first camera 8A. The image capture device 8 captures an image in response to an image capture instruction from an article recognition device 3 (see FIG. 2), and outputs the captured image obtained by capturing the image to the article recognition device 3.

The automated warehouse 13 has storage shelves 13A capable of storing first containers 51, and a stacker crane 13B. The unloading conveyor 9 transports, to the picking conveyor 6, the first container 51 that has been transported from a storage shelf 13A in the automated warehouse 13 by the stacker crane 13B. The picking conveyor 6 transports, to the picking area 12, the first container 51 that has been transported by the unloading conveyor 9, and transports, to the loading conveyor 10, the first container 51 from which articles 50 to be taken out have been taken out in the picking area 12. The loading conveyor 10 transports the first container 51 that has been transported by the picking conveyor 6, to a loading position (an end portion of the loading conveyor 10 on the down side in the transporting direction). The first container 51 that has been transported to the loading position is reloaded to a storage shelf 13A by the stacker crane 13B.

Note that a first transport device 18 for transporting the first container 51 from a storage shelf 13A to the picking area 12 is constituted by the stacker crane 13B, the unloading conveyor 9, and a portion of the picking conveyor 6 on the upstream side in the transporting direction relative to the picking area 12. Also, a second transport device 19 for transporting the first container 51 from the picking area 12 to a storage shelf 13A is constituted by the stacker crane 13B, the loading conveyor 10, and a portion of the picking conveyor 6 on the downstream side in the transporting direction relative to the picking area 12.

Figure 5:
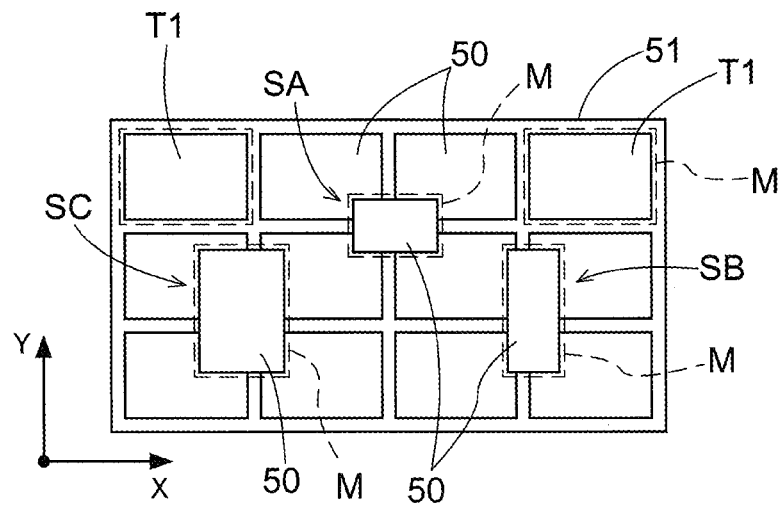
FIG. 5 is a plan view of the container according to the embodiment of the present invention.
Figure 6:
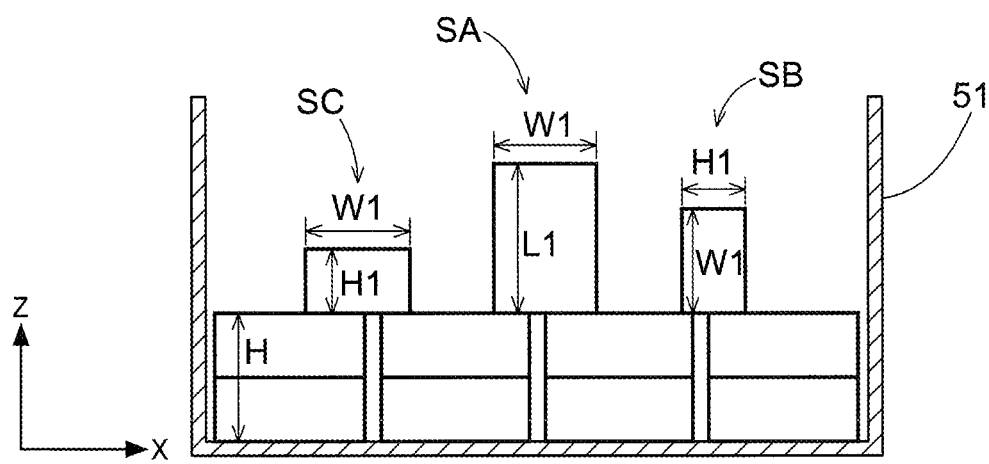
FIG. 6 is a vertical side view of the container according to the embodiment of the present invention.

Here, the first container 51 is formed to have a rectangular-parallelepiped shape whose upper face is open such that an image of the inside of the container can be captured by the image capture device 8. For example, the first container 51 is a resin container or the like, whose upper face is open. Also, as shown in FIG. 4, the first container 51 can accommodate a plurality of articles 50 in a state of being arranged in the in-container length direction X, the in-container width direction Y, and the height direction Z. Specifically, the first container 51 accommodates article layers, which are formed by a plurality of articles 50 with the same shape arranged in a predetermined normal orientation SC such that upper faces T1 (see FIG. 7 and other diagrams) are at the same height, in a state where the article layers are stacked in the height direction Z. In the present embodiment, a description will be given using, as an example of an arrangement state of a plurality of articles 50 in the first container 51, an example of an arrangement state where, when the first container 51 has been transported to the picking area 12, two article layers formed by a total of twelve articles 50, four of which are arranged in the in-container length direction X and three of which are arranged in the in-container width direction Y, are stacked in the height direction Z, and furthermore, three articles 50 are randomly stacked on the article layers, as shown in FIGS. 5 and 6.

All of the articles 50 accommodated in one first container 51 are formed to have the same rectangular-parallelepiped shape. Also, in the present embodiment, when in the normal orientation SC, the length of each article 50 in the height direction Z is referred to as a "length H1", the length of each article 50 in the length direction as viewed from the height direction Z is referred to as a "length L1", and the length of each article 50 in the short direction as viewed from the height direction Z is referred to as a "length W1", as shown in FIG. 4. This dimensional information regarding the articles 50 is stored in advance in an article information database 4 (described later). In the present embodiment, the relationship between the lengths of the sides of each article 50 is expressed as H1<W1<L1, and the normal orientation SC is an orientation in which the shortest one (height H1) of the three sides extending from one vertex of the article 50 extends in the height direction Z.

As shown in FIG. 4, articles 50 are accommodated in the normal orientation SC in the first container 51, as mentioned above. More specifically, in the first container 51, the articles 50 are accommodated in an orientation (normal orientation SC) in which reference outer faces F of each article 50 is parallel to a bottom face of the first container 51, the reference outer faces F being two predetermined faces that are parallel to each other. That is to say, even if an article 50 in the normal orientation SC is vertically inverted, this article 50 is still in the normal orientation SC. Even if an article 50 in the normal orientation SC is rotated around an axis parallel to the height direction Z, this article 50 is still in the normal orientation SC. Thus, each article 50 in this example has a rectangular-parallelepiped shape with a pair of reference outer faces F that face toward opposite sides. The normal orientation SC is an orientation in which the pair of reference outer faces F are oriented in the height direction Z. Although not shown in the diagrams, articles 50 are transferred to the second container 53 by the picking robot 5 such that the articles 50 are accommodated in the normal orientation SC. Note that, in the present embodiment, outer faces of each article 50 that have the largest area serve as the reference outer faces F.

In the picking facility 100, if the host controller 2 detects, using a sensor or the like (not shown), that a first container 51 is present in the picking area 12, the host controller 2 outputs an article search command to the article recognition device 3. The article recognition device 3 performs orientation/position specification processing to specify a three-dimensional position and a plan-view orientation of the upper face T1 of an article 50 that is present in the picking area 12, in accordance with the article search command, and outputs recognition result information obtained through this processing to the host controller 2. The host controller 2 outputs operation command information that includes the recognition result information, together with an operation command, to the picking robot 5. Note that the operation command information includes the recognition result information and container information acquired from the later-described article information database 4. Note that a control device H is constituted by the host controller 2 and the article recognition device 3.

Picking Robot

Figure 3:
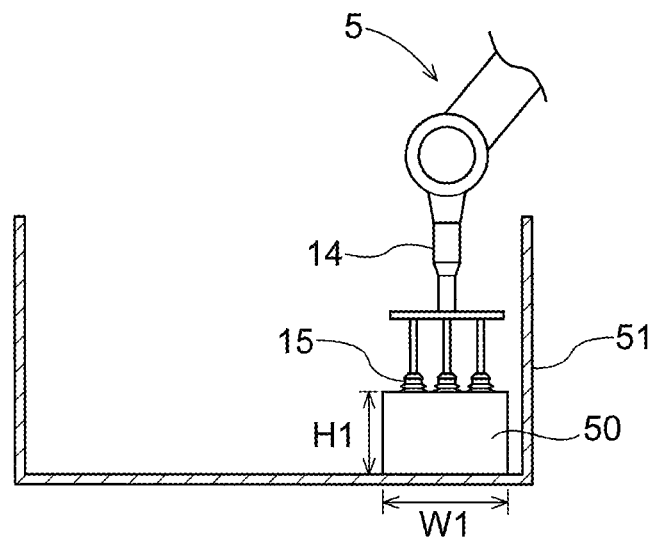
FIG. 3 is a schematic diagram showing a state of picking performed by the picking facility according to the embodiment of the present invention.

The picking robot 5 is connected to the host controller 2 and the article recognition device 3 so as to be able to communicate information thereto. As shown in FIG. 3, the picking robot 5 has a multi-joint arm 14 and a plurality of suction pads 15 that are supported at a leading end of the arm 14, and is configured to suction and support an article 50 using the suction pad 15. The picking robot 5 transfers an article 50 by bending at joint portions of the arm 14 and suctioning the article 50 using the suction pad 15. In response to the operation command and the operation command information (recognition result information and container information) from a robot control unit 24 of the host controller 2, the picking robot 5 suctions an article 50 that is to be transferred and takes out the article 50 from the first container 51, and moves the arm 14 to accommodate the article 50 that has been taken out into the second container 53. Note that the picking robot 5 corresponds to a transfer device for transferring an article 50 from the first support body located at the transfer position to the second support body, the suction pad 15 corresponds to a holding portion for holding an upper portion of the article 50.

The picking robot 5 is configured to be able to perform a first operation to transfer an article 50 from the first container 51 to the second container 53, and a second operation to change the orientation of the article 50. The picking robot 5 performs the first operation when receiving a first operation command as the operation command from the robot control unit 24, and performs the second operation when receiving a second operation command as the operation command from the robot control unit 24.

As shown in FIG. 6, the normal orientation SC is an orientation in which the sides with the height H1 extend in the height direction Z. The overturned long orientation SA is an orientation in which the sides with the length L1 extend in the height direction Z. The overturned short orientation SB is an orientation in which the sides with the length W1 extend in the height direction Z. Articles 50 are accommodated in the normal orientation SC in the first container 51. However, the orientation of articles 50, which have been in the normal orientation SC, may change to the overturned long orientation SA or the overturned short orientation SB due to swinging or vibration occurring on the first container 51 when the first container 51 is transported by the first transport device 18. Meanwhile, there may also be cases where the orientation of articles 50 in the overturned long orientation SA or the overturned short orientation SB is restored to the normal orientation SC due to such swinging or vibration occurring on the first container 51.

In the first operation, the picking robot 5 operates so as to accommodate an article 50 that is accommodated in the normal orientation SC in the first container 51, into the second container 53 in the normal orientation SC. Specifically, in the first operation, the picking robot 5 operates so as to suction and support, using the suction pad 15, the upper face T1 of an article 50 in the normal orientation SC that is accommodated in the first container 51, then accommodates the suctioned article 50 into the second container 53 in the normal orientation SC, and thereafter cancel the suctioning of the article 50.

Figure 8:
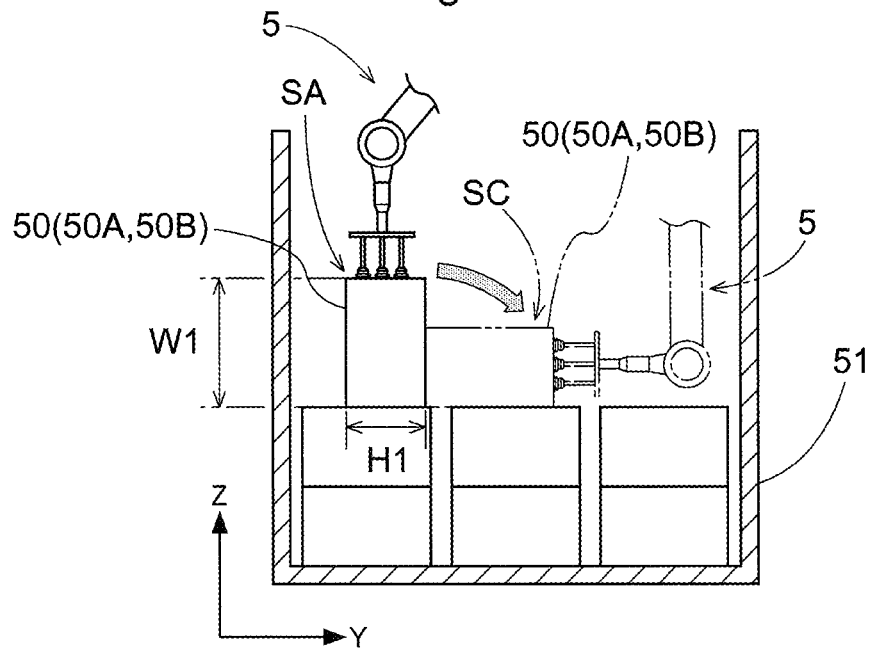
FIG. 8 is a cross-sectional front view of the container showing the state of a second operation according to the embodiment of the present invention.

In the second operation, the picking robot 5 operates so as to change the orientation of an article 50 that is accommodated in the overturned long orientation SA or the overturned short orientation SB in the first container 51, to the normal orientation SC. Specifically, in the second operation, as shown in FIG. 8, the picking robot 5 operates so as to suction and support, using the suction pad 15, the upper face T1 of an article 50 in the overturned long orientation SA or the overturned short orientation SB (the overturned long orientation SA in the example shown in FIG. 8) accommodated in the first container 51, then change the orientation of the article 50 to the normal orientation SC by bending at the joint portions of the arm 14, and thereafter cancel the suctioning of the article 50.

The configuration of the host controller 2 and the article recognition device 3 will be described below in detail. Note that, in the following description, the first container 51 will be referred to simply as a container 51.

Host Controller

Figure 2:
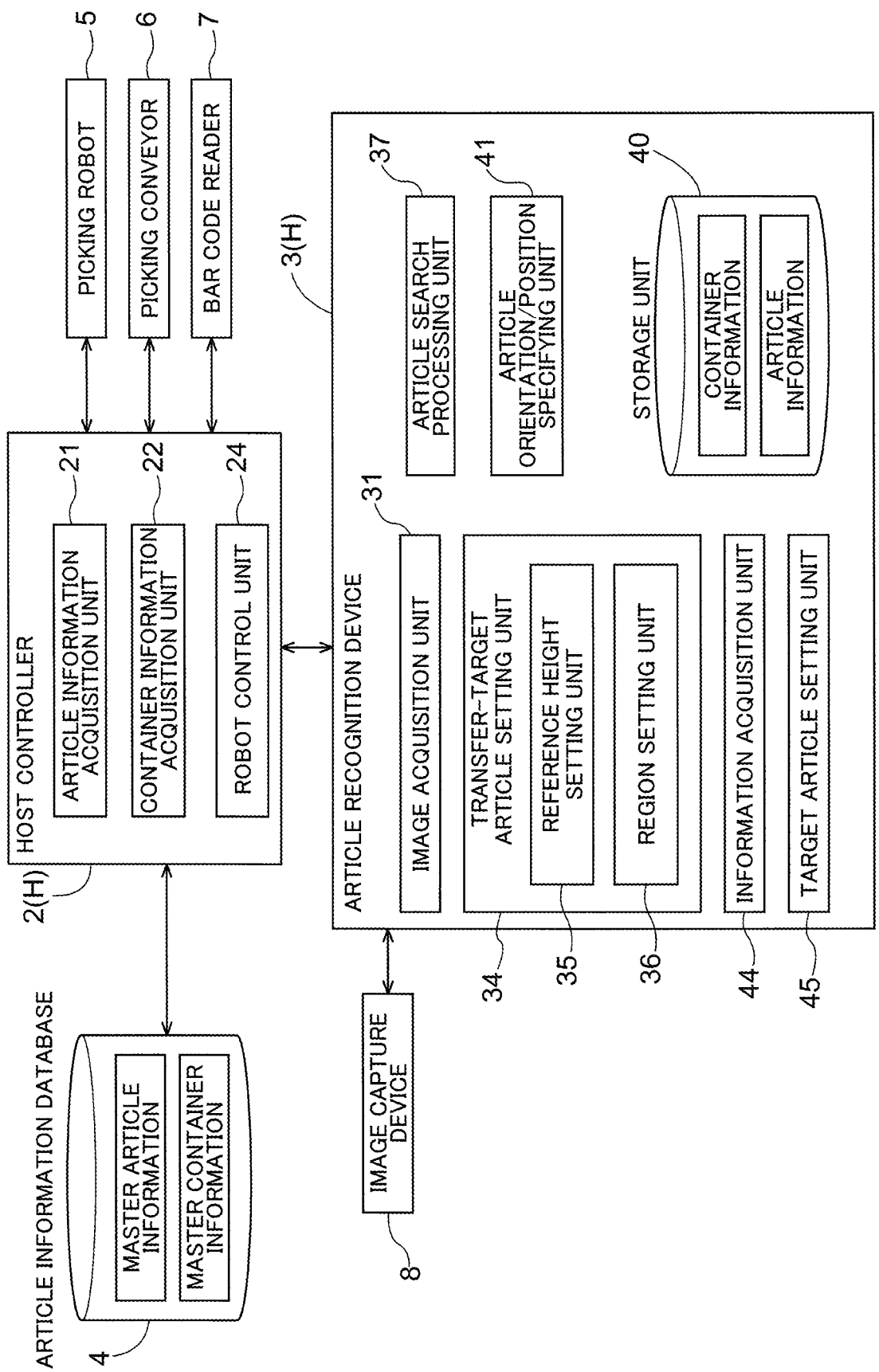
FIG. 2 is a control block diagram of the picking facility according to the embodiment of the present invention.

As shown in FIG. 2, the host controller 2 includes an article information acquisition unit 21, a container information acquisition unit 22, and a robot control unit 24. The host controller 2 is connected to not only the picking robot 5 and the article recognition device 3, but also the article information database 4, the picking conveyor 6, and the bar code reader 7 so as to be able to communicate information thereto.

Here, the article information database 4 stores, as master container information, dimensional information regarding three sides of each container 51 that is registered as a master by a registration device (not shown), in association with ID information assigned to the container 51. Note that the master container information includes ID information regarding articles 50 accommodated in a container 51 and information representing the quantity of the articles 50 accommodated in each container 51, in association with the ID information regarding the container 51.

The article information database 4 stores, as master article information, dimensional information and a template image regarding each of a plurality of types of articles 50 that are registered as a master by a registration device (not shown), in association with ID information regarding each article 50. The dimensional information regarding an article 50 is information indicating the dimensions (length H1, length L1, and length W1) of three sides extending from one vertex of the article 50. The template image is an image that serves as a template when an article presence region M is detected through later-described pattern matching processing.

The container information acquisition unit 22 is a functional unit for acquiring container information unique to a container 51 that is present in the picking area 12 from the master container information in the article information database 4. Specifically, the container information acquisition unit 22, upon detecting that a container 51 is present in the picking area 12, acquires ID information regarding the container 51 from the bar code reader 7. The container information acquisition unit 22 then acquires container information regarding the container 51 associated with the ID information from the master container information stored in the article information database 4.

The article information acquisition unit 21 is a functional unit for acquiring article information regarding an article 50 accommodated in the container 51 that is present in the picking area 12, from the master article information in the article information database 4. Specifically, when the container information acquisition unit 22 acquires container information, the article information acquisition unit 21 acquires article information regarding an article 50 (dimensional information and template image of the article 50) associated with the ID information regarding the container 51, from the master article information stored in the article information database 4.

The robot control unit 24 is a functional unit for controlling the picking robot 5. In the present embodiment, upon detecting that a container 51 is present in the picking area 12, the robot control unit 24 outputs an article search command to the article recognition device 3, and outputs the container information acquired by the container information acquisition unit 22 to the article recognition device 3. Also, upon acquiring the recognition result information output from the article recognition device 3, the robot control unit 24 outputs an operation command to the picking robot 5, and also outputs the operation command information together. Note that the recognition result information is information representing a three-dimensional position and a plan-view orientation of the upper face T1 of an article 50 that are output from an article orientation/position specification unit 41 (described later). Note that the first operation command is given as an operation command if the orientation of an article 50 is the normal orientation SC, and the second operation command and the first operation command are given as operation commands if the orientation of an article 50 is anything other than the normal orientation SC.

Article Recognition Device

The article recognition device 3 is a device that recognizes a three-dimensional position of the upper face T1 of an article to be transferred 50B, and a plan-view orientation that is an arrangement state of the upper face T1 in a plan view. As shown in FIG. 2, the article recognition device 3 includes an image acquisition unit 31, a transfer-target article setting unit 34, an article search processing unit 37, a storage unit 40, an article orientation/position specification unit 41, an information acquisition unit 44, and a target article setting unit 45. The article recognition device 3 has a processing device such as a CPU as a core member, and is configured by one of or both hardware and software (program) being mounted as a functional unit for performing various kinds of processing on input data.

The image acquisition unit 31 is a functional unit for acquiring a captured image from the image capture device 8. In the present embodiment, the image acquisition unit 31, upon receiving the article search command from the host controller 2, outputs an image capture instruction to the image capture device 8, and acquires, from the image capture device 8, a captured image that is captured based on the image capture instruction. Since this captured image includes information representing the distance from the image capture device 8 (first camera 8A) to the upper face T1 of an article 50, the image acquisition unit 31 acquires height information indicating the height of the upper face T1 of the article 50 from the container bottom face at a position corresponding to each pixel of the captured image, based on the distance information and a known height of the image capture device 8 (first camera 8A) from the transport surface P (container bottom face). Then, the image acquisition unit 31 generates a basic image with pixels having the above-acquired height information representing the height from the bottom face, and stores this basic image in the storage unit 40.

The information acquisition unit 44 is a functional unit for acquiring container information regarding a container 51 that is present in the picking area 12 and article information regarding articles 50 accommodated in the container 51 that are output from the host controller 2. In the present embodiment, the information acquisition unit 44 stores the acquired container information and article information in the storage unit 40.

Figure 7:
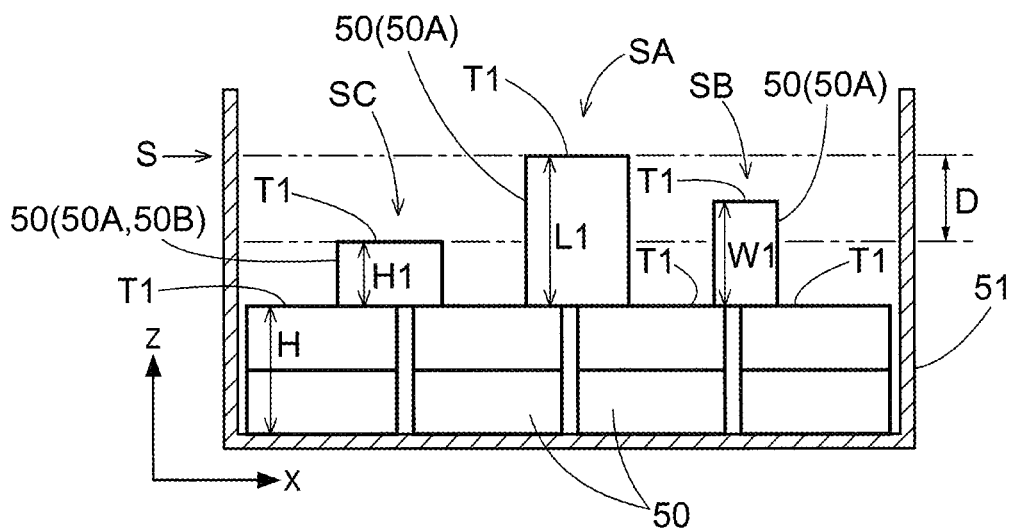
FIG. 7 is a cross-sectional side view of the container showing a target region according to the embodiment of the present invention.

The article search processing unit 37 is a functional unit for performing pattern matching processing on the basic image using a template image, and detecting, as an article presence region M, a region that is included in the basic image and in which the degree of matching with the template image is greater than or equal to a predetermined threshold. The article search processing unit 37, upon receiving a command to perform article search processing from the transfer-target article setting unit 34, acquires image capture information regarding the template image, the basic image, and the like that are included in the article information, from the storage unit 40. The article search processing unit 37 then sets an area (search area) that corresponds to the inside of the container 51 in the basic image through the article search area setting processing, and performs pattern matching processing in the image search area based on the template image and the basic image. Then, the article search processing unit 37 detects, in the basic image, a region in which the degree of matching with the template image is greater than or equal to the predetermined threshold, and stores the detected region as an article presence region M, in the storage unit 40. Specifically, in the case where, for example, an article 50 in the normal orientation SC, an article 50 in the overturned long orientation SA, and an article 50 in the overturned short orientation SB are placed on the upper faces T1 of articles 50 in the second layer, of the layers stacked in the height direction Z, as shown in FIGS. 5 and 7, a region where each of these articles 50 is present is detected as an article presence region M (see FIG. 5).

In addition, a region where each of the articles 50 in the second layer on which no other articles 50 are present is also detected as an article presence region M (see FIG. 5). The article search processing unit 37 then performs orientation determination processing to determine the orientation of the article 50 that is present in each of the article presence regions M, based on the template image, and stores, in the storage unit 40, information representing the orientation of the article 50 that is present in the article presence region M together with information representing this article presence region M. In the orientation determination processing, if the upper face T1 of an article 50 that is present in an article presence region M matches the reference outer faces F, and the upper face T1 of this article 50 is parallel to the bottom face of the container 51, it is determined that the orientation of the article 50 is the normal orientation SC. If the upper face T1 of an article 50 that is present in an article presence region M does not match the reference outer faces F, or if the upper face T1 of the article 50 tilts with respect to the bottom face of the container 51, it is determined that the orientation of the article 50 is not the normal orientation SC.

Thus, in the orientation determination processing, orientation determination is performed to determine whether or not the orientation of each article 50 accommodated in the container 51 is the normal orientation SC.

The transfer-target article setting unit 34 is a functional unit for setting, as a transfer-target article 50A, an article 50 that is located at the highest position among a plurality of articles 50 accommodated in the container 51, and an article 50 with the upper face T1 present in an area of a set distance D downward with respect to the upper face T1 of the article 50 located at the highest position. In the present embodiment, the transfer-target article setting unit 34 includes a reference height setting unit 35 and a region setting unit 36.

The reference height setting unit 35 is a functional unit for setting, as a reference height S, the height of a face that is the top face, of the faces of a plurality of articles 50 accommodated in the container 51. In the present embodiment, the reference height setting unit 35 performs reference height setting processing to set, as the reference height S, the height of the highest article presence region M, of a plurality of article presence regions M detected by the article search processing unit 37. Specifically, the reference height setting unit 35 acquires information regarding the article presence regions M from the storage unit 40, performs height determination to determine the height of each of the plurality of article presence regions M based on the information regarding the article presence regions M, and sets, as the reference height S, the height of the highest article presence region M among the plurality of article presence regions M, i.e. the height of the highest upper face T1 among the upper faces T1 of the plurality of articles 50 accommodated in the container 51. Note that, in the height determination, the height of the articles 50 that are present in the article presence regions M in the container 51 is determined as mentioned above. In the state where the articles 50 are accommodated in the container 51 as shown in FIGS. 5 and 7, the height of the upper face T1 of the article 50 in the overturned long orientation SA placed on the upper faces T1 of the articles 50 in the second layer is the highest, and thus, the height of the upper face T1 of this article 50 in the overturned long orientation SA is set as the reference height S. The reference height setting unit 35 then stores information representing the set reference height S in the storage unit 40.

The region setting unit 36 is a functional unit for setting a target region corresponding to the upper face T1 of the article 50 located at the highest position in the container 51, and setting the article 50 whose upper face T1 is present in the target region as a transfer-target article 50A. More specifically, the region setting unit 36 performs region setting processing to set, as a target region, an area of the set distance D downward from the reference height S. In the present embodiment, the set distance D is set as the length obtained by subtracting the length H1 from the length L1. The region setting unit 36 then sets an article 50 whose upper face T1 is present in the set target region as a transfer-target article 50A. The case will be considered as an example where an article 50 in the overturned long orientation SA is present as an article 50 whose upper face T1 is at the reference height S, and an article 50 in the normal orientation SC and an article 50 in the overturned short orientation SB are present as articles 50 whose lower faces are at the same height as the lower face of the article 50 in the overturned long orientation SA, as shown in FIG. 7. In this case, the upper face T1 of the article 50 in the normal orientation SC, the upper face T1 of the article 50 in the overturned long orientation SA, and the upper face T1 of the article 50 in the overturned short orientation SB are present in the target region. The region setting unit 36 performs transfer-target article setting processing to set, as transfer-target articles 50A, the article 50 in the normal orientation SC, the article 50 in the overturned long orientation SA, and the article 50 in the overturned short orientation SB whose upper faces T1 are present in the target region.

The target article setting unit 45 is a functional unit for selecting an article to be transferred 50B from the articles 50 accommodated in the first container 51. The target article setting unit 45 performs article-to-be-transferred setting processing to set, as an article to be transferred 50B, one of the plurality of articles 50 that are set as the transfer-target articles 50A. More specifically, the target article setting unit 45 performs article-to-be-transferred setting processing in which, if there are a plurality of transfer-target articles 50A, a transfer-target article 50A in the normal orientation SC is preferentially selected as an article to be transferred 50B from the plurality of transfer-target articles 50A, and if there are a plurality of transfer-target articles 50A in the normal orientation SC, a transfer-target article 50A located at the highest position among these transfer-target articles 50A is preferentially set as an article to be transferred 50B. Also, in the article-to-be-transferred setting processing, if there is no transfer-target article 50A in the normal orientation SC, a transfer-target article 50A whose upper face T1 is disposed at the highest position among the plurality of transfer-target articles 50A is selected as an article to be transferred 50B. If a plurality of transfer-target articles 50A (the upper faces T1 of the transfer-target articles 50A) in the normal orientation SC are at the same height, one of these transfer-target articles 50A is selected as an article to be transferred 50B in accordance with another selection rule.

Note that this selection rule may be, for example, a rule in which one of a plurality of corner portions of the first container 51 is set as a reference corner portion, and a transfer-target article 50A closest to the reference corner portion is preferentially selected. In the example shown in FIG. 7, there are three transfer-target articles 50A, and among them, the article 50 in the normal orientation SC is selected as an article to be transferred 50B. If this article 50 in the normal orientation SC is not present, the transfer-target article 50A with the upper face T1 at the highest position is selected as an article to be transferred 50B. Note that the article-to-be-transferred setting processing corresponds to a selection control.

Figure 9:
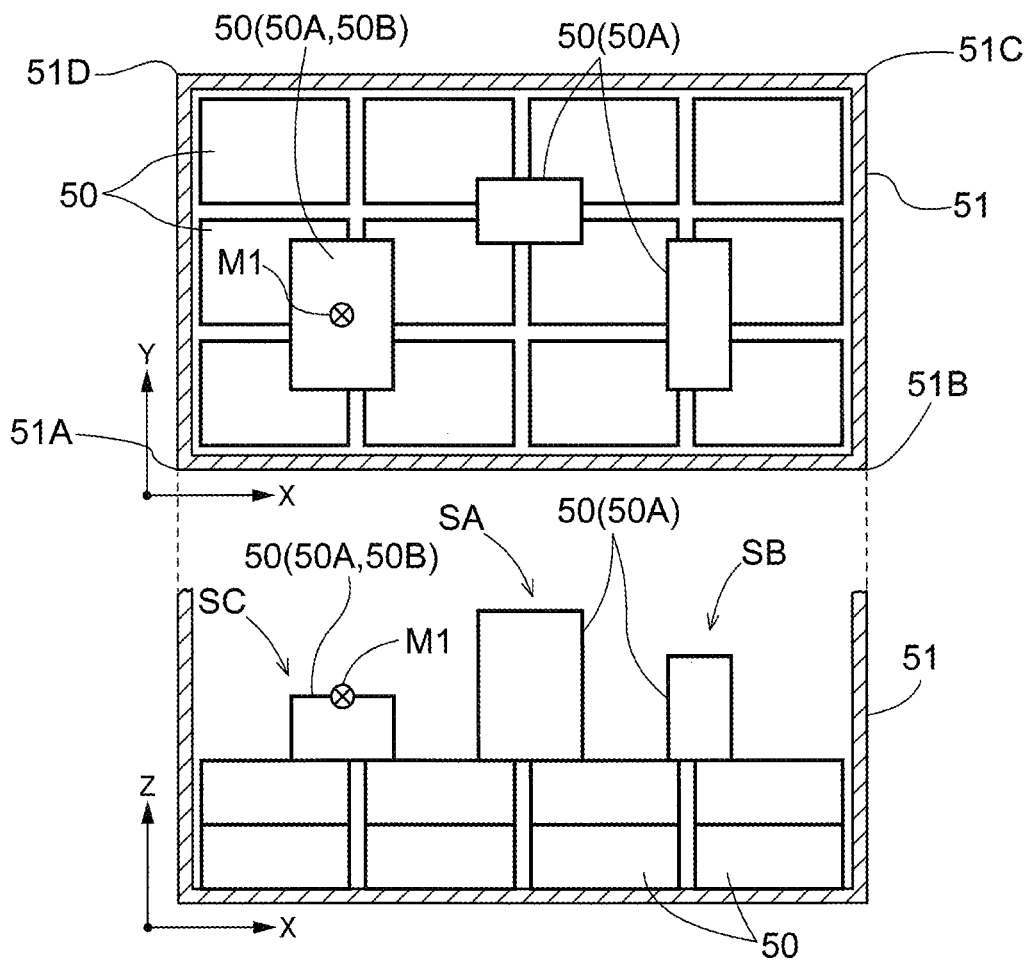
FIG. 9 is a diagram illustrating a reference position of articles to be transferred according to the embodiment of the present invention.

The article orientation/position specification unit 41 is a functional unit for specifying the three-dimensional position and the plan-view orientation of the upper face T1 of the article to be transferred 50B in the container 51. The article orientation/position specification unit 41 performs orientation/position specification processing to acquire, for example, information representing the article presence region M corresponding to the article to be transferred 50B from the storage unit 40, specify the central position M1 of the article presence region M (see FIG. 9) as the three-dimensional position of the upper face T1 of the article 50, and specify the rotation angle (inclination) of the article presence region M with respect to the container 51 as the plan-view orientation of the upper face T1 of the article 50. The article orientation/position specification unit 41 outputs information representing the three-dimensional position and the plan-view orientation of the article to be transferred 50B specified through the orientation/position specification processing as recognition result information to the robot control unit 24 of the host controller 2. Note that the recognition result information is information indicating the center position M1 of the article to be transferred 50B, as shown in FIG. 9.

Processing Procedure of Article-to-be-Transferred Selection Processing

Figure 10:
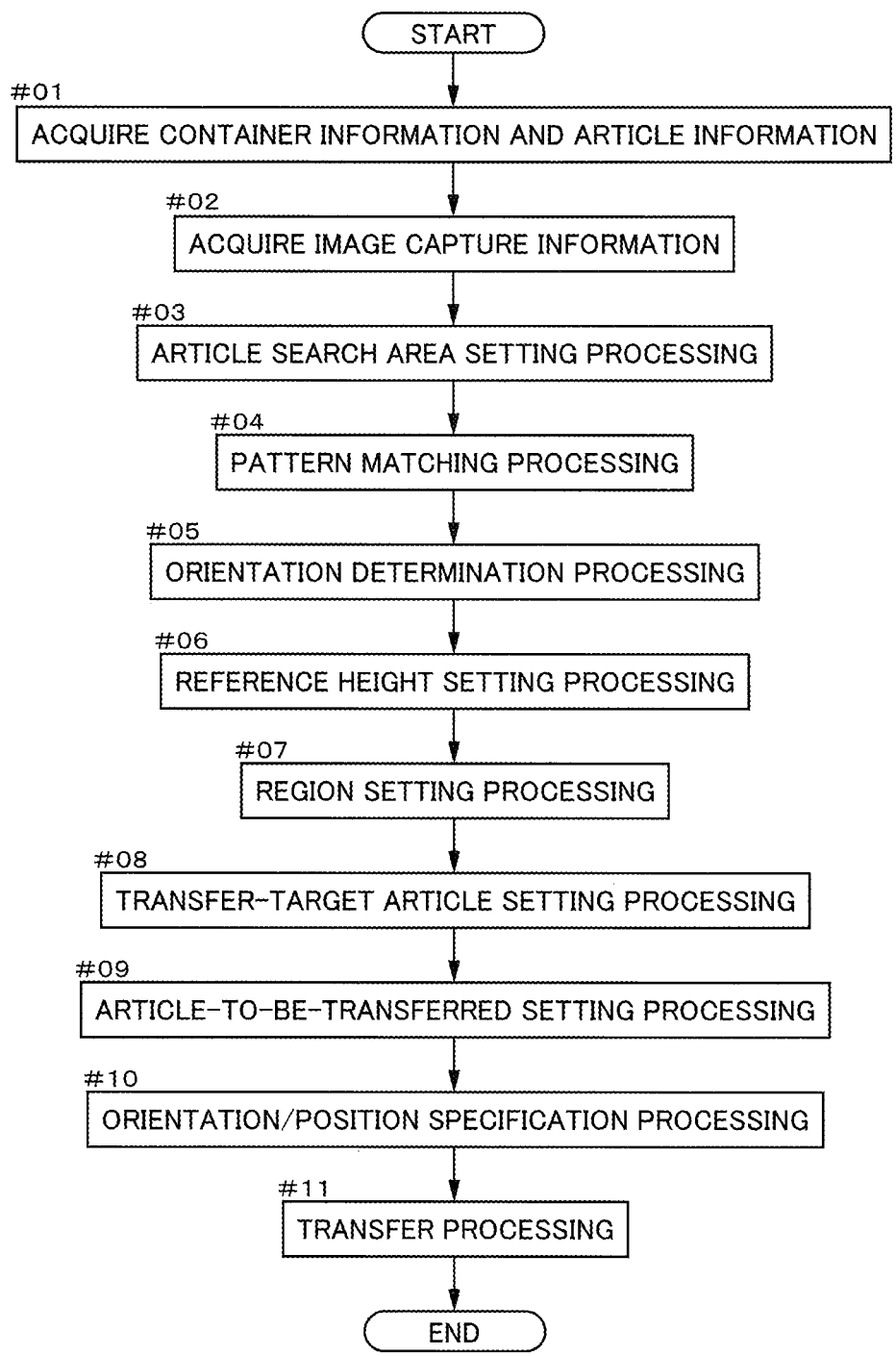
FIG. 10 is a flowchart of article-to-be-transferred selection processing according to the embodiment of the present invention.

A processing procedure of article-to-be-transferred selection processing performed by the host controller 2, the article recognition device 3, and the picking conveyor 6, i.e. an article recognition facility according to the present embodiment will be described with reference to FIG. 10. The procedure of the article-to-be-transferred selection processing described below is performed by hardware and/or software (program) that constitutes the functional units of the host controller 2, the article recognition device 3, and the picking conveyor 6. In the case where the above-described functional units are implemented by programs, processing units (not shown) that the host controller 2, the article recognition device 3, and the picking conveyor 6 have may operate as computers for executing programs that constitute the functional units, or a processing unit of the host controller 2 may operate as a computer that executes a program that constitutes all of the functional units of the article recognition facility.

Article-to-be-Transferred Selection Processing

In the article-to-be-transferred selection processing according to the present embodiment, first, the information acquisition unit 44 acquires the container information and the article information that are output together with the article search command from the host controller 2 (step #01). Then, the image acquisition unit 31 acquires a captured image (image capture information) from the image capture device 8 based on the article search command (step #02). Next, the transfer-target article setting unit 34 performs the article search area setting processing to set an area (search area) corresponding to the inside of a container 51 in the basic image (step #03), performs pattern matching processing on the search area set through the article search area setting processing (step #04), and performs the orientation determination processing to determine whether or not the orientation of an article 50 that is present in an article presence region M is in the normal orientation SC, for the article presence region M detected through the pattern matching processing (step #05).

Furthermore, the transfer-target article setting unit 34 performs the reference height setting processing to set, as the reference height S, the height of the highest article presence region M among a plurality of article presence regions M (step #06), and performs the region setting processing to set, as a target region, an area of the set distance D downward from the reference height S (step #07). Next, the transfer-target article setting unit 34 performs the transfer-target article setting processing to set articles 50 whose upper faces T1 are present in the target region, as transfer-target articles 50A (step #08), and then performs the article-to-be-transferred setting processing to set an article to be transferred 50B from the transfer-target articles 50A (step #09).

Upon the article to be transferred 50B being set, the article orientation/position specification unit 41 performs the orientation/position specification processing to specify the three-dimensional position and the plan-view orientation of the set article to be transferred 50B (step #10), and outputs the recognition result information indicating the three-dimensional position and the plan-view orientation of the upper face T1 of the article to be transferred 50B to the host controller 2. The host controller 2 that has received the recognition result information performs the transfer control to output the operation command information, which includes the recognition result information, and the operation command to the picking robot 5 (step #11). In this transfer control, the picking robot 5 is controlled so as to transfer the transfer-target article 50A (the article to be transferred 50B) selected through the article-to-be-transferred setting processing, from the first container 51 to the second container 53.

The picking robot 5 performs only the first operation, of the first operation and the second operation, or both the first operation and the second operation based on the recognition result information and the operation command, suctions the upper face T1 of the article to be transferred 50B accommodated in the first container 51 using the suction pad 15, and stores the suctioned article to be transferred 50B in the normal orientation SC in the second container 53.

2. Other Embodiments

Next, other embodiments of the picking facility will be described.

Figure 11:
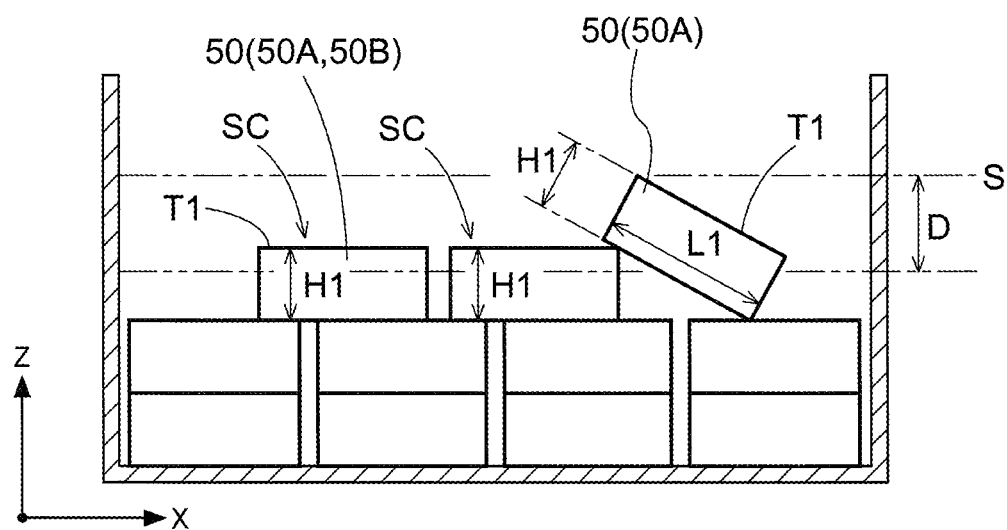
FIG. 11 is a vertical side view of a container according to another embodiment of the present invention.

(1) In the above embodiment, if the upper face T1 that is the highest face among the upper faces T1 of a plurality of articles 50 accommodated in the container 51 is parallel to the bottom face of the container 51, the height of this upper face T1 that is the highest face is set as the reference height S. However, as shown in FIG. 11, in the case where the upper face T1 that is the highest face tilts with respect to the bottom face of the container 51, the height of this upper face T1 that is the highest face may also be set as the reference height S. In this case, as shown in FIG. 11, the height of an upper end of the upper face T1 that is the highest face may be set as the reference height S.

(2) In the above embodiment, the set distance D is set as a length corresponding to the length obtained by subtracting the length H1 from the length L1, but the set distance D may be changed as appropriate. Specifically, for example, the set distance D may be set as a length corresponding to one of the length H1, the length L1, and the length W1. Alternatively, the set distance D may be set as a length corresponding to the length obtained by subtracting the length H1 from the length W1. Note that "a length corresponding to" may be the same length as the reference length, or may be a length obtained by adding a set length (e.g. about several millimeters) to the reference length or subtracting the set length from the reference length.

(3) In the above embodiment, each article 50 has a rectangular-parallelepiped with six faces including a pair of reference outer faces F, but the shape of each article 50 is not limited thereto. Each article 50 may have a shape in a plan view other than a rectangular shape; for example, each article 50 may have a cylindrical or triangular columnar shape, or the like. Also, the articles 50 may be flexible. For example, each article 50 may be a flexible bag in which clothes are enclosed. In this case, the lower face and the upper face of an article 50 in the normal orientation SC are likely to have a shape extending along the bottom face of the container 51 due to gravity, and these upper face and lower face of the article 50 serve as a pair of reference outer faces F.

(4) In the above embodiment, the automated warehouse 13 is constituted by the storage shelves 13A and the stacker crane 13B, but the configuration of the automated warehouse 13 may be changed as appropriate; for example, the automated warehouse 13 may be constituted by the storage shelves 13A, a plurality of transport carriages arranged in the height direction Z, a plurality of relay conveyors arranged in the height direction Z, and a lift base. In the case where the automated warehouse 13 is constituted by the storage shelves 13A, a plurality of transport carriages arranged in the height direction Z, a plurality of relay conveyors arranged in the height direction Z, and a lift base, each of the transport carriages delivers an article 50 taken out from a storage shelf 13A to the relay conveyor installed at the same height, and delivers an article 50 received from a relay conveyor installed at the same height to a storage shelf 13A. Each of the relay conveyors delivers an article 50 received from a transport carriage installed at the same height to the lift base, and delivers an article 50 received from the lift base to a transport carriage installed at the same height. The lift base delivers an article 50 received from one of the plurality of relay conveyors arranged in the height direction Z to the unloading conveyor 9, and delivers an article 50 received from the loading conveyor 10 to one of the plurality of relay conveyors arranged in the height direction Z.

(5) In the above embodiment, the first transport device 18 is constituted by the stacker crane 13B, the unloading conveyor 9, and a portion of the picking conveyor 6 on the upstream side in the transporting direction with respect to the picking area 12, but the configuration of the first transport device 18 may be changed as appropriate. Specifically, for example, the automated warehouse 13 may be constituted by the storage shelves 13A, a plurality of transport carriages arranged in the height direction Z, a plurality of relay conveyors arranged in the height direction Z, and a lift base, and the first transport device 18 may be constituted by the plurality of transport carriages, the plurality of relay conveyors, the lift base, the unloading conveyor 9, and the portion of the picking conveyor 6 on the upstream side in the transporting direction with respect to the picking area 12.

(6) In the above embodiment, the second transport device 19 is constituted by the stacker crane 13B, the loading conveyor 10, and a portion of the picking conveyor 6 on the downstream side in the transporting direction with respect to the picking area 12, but the configuration of the second transport device 19 may be changed as appropriate. The automated warehouse 13 may be constituted by the storage shelves 13A, a plurality of transport carriages arranged in the height direction Z, a plurality of relay conveyors arranged in the height direction Z, and a lift base, and the second transport device 19 may be constituted by the plurality of transport carriages, the plurality of relay conveyors, the lift base, the loading conveyor 10, and the portion of the picking conveyor 6 on the downstream side in the transporting direction with respect to the picking area 12.

(7) The above embodiment has been described while taking, as an example, a configuration in which the transfer device 5 includes the holding portion 15 for holding the upper face T1 of an article 50 by suctioning the upper face T1, for example, and the upper portion of the article 50 is held by this holding portion 15. However, the configuration of the transfer device 5 may be changed as appropriate. Specifically, the transfer device 5 may include a holding portion that holds the upper portion of an article 50 by holding the upper portion of the article 50 from two opposite sides, or a holding portion that holds the upper portion of the article 50 by engaging with the upper portion of the article 50, in addition to or in place of the holding portion 15 for holding the upper face T1 of the article 50. Also, the transfer device 5 may also include a side-face holding portion for holding a side face of an article 50, in addition to the holding portion 15 for holding the upper face of the article 50.

(8) Note that the configurations disclosed in each of the above-described embodiments may also be combined with the configurations disclosed in the other embodiments unless inconsistency occurs. As to other configurations as well, the embodiments disclosed in the present specification are merely examples in all respects. Accordingly, various alterations may be made as appropriate without departing from the gist of the present disclosure.

3. Summary of Above Embodiment

The summary of the above-described picking facility will be described.

The picking facility includes: a transfer device for transferring an article from a first support body to a second support body; an image capture device for capturing, from above, an image of the article placed on the first support body; and a control device for controlling the transfer device, the transfer device including a holding portion for holding an upper portion of the article, wherein the control device performs height determination to determine a height of the article placed on the first support body, and orientation determination to determine whether or not an orientation of the article placed on the first support body is a normal orientation, based on image capture information from the image capture device, of a plurality of the articles supported by the first support body, the article located at a highest position and the article whose upper face is present in a range of a set distance downward from an upper face of the article located at the highest position are set as transfer-target articles, and the control device performs a selection control to preferentially select, from the transfer-target articles, a transfer-target article in the normal orientation, and a transfer control to control the transfer device so as to transfer the transfer-target article selected through the selection control from the first support body to the second support body.

According to this configuration, if articles to be transferred include an article in the normal orientation and an article in an orientation other than the normal orientation, the article in the normal orientation is preferentially selected and transferred from the first support body to the second support body. That is to say, even if the upper face of the article in the normal orientation, of the articles to be transferred, is lower than the upper face of the article in an orientation other than the normal orientation, the article in the normal orientation is preferentially selected through the selection control, and is transferred to the second support body through the transfer control.

As a result, in the case where articles needs to be transferred in the normal orientation to the second support body, the ratio of articles whose orientation is changed can be reduced compared with the case of simply preferentially selecting an article with the highest upper face and transferring this article to the second support body. It is therefore possible to shorten the time required to transfer a plurality of articles from the first support body to the second support body. Further, in the case where the upper face of an article is held by the holding portion, and the normal orientation is set such that the upper face is larger than the side face, the article can be stably held by holding the upper face of the article that is relatively large, and it is possible to reduce the likelihood that an error occurs when the article is held by the holding portion. Furthermore, in the case where the height of an article in the normal orientation is made lower than the height of an article in the overturned long orientation or the overturned short orientation, and the article in the normal orientation is to be held, the holding state of the article during the transfer operation can be readily stabilized and the speed of the transfer operation can be readily increased since the distance from the position at which the article is held by the holding portion to the center of gravity of the article is shorter than that in the case of holding the article in the overturned long orientation or the overturned short orientation in which the article is vertically longer than that in the normal orientation. Accordingly, the time required to transfer a plurality of articles from the first support body to the second support body can be shortened.

Here, it is preferable that, in the selection control, if there are a plurality of the transfer-target articles in the normal orientation, the control device preferentially selects, from the plurality of transfer-target articles, a transfer-target article located at a highest position.

According to this configuration, an article located at the highest position among a plurality of articles in the normal orientation is preferentially transferred, and it is therefore possible to reduce the likelihood that the article, when being transferred from the first support body, interferes with other articles placed in the first support body.

Also, it is preferable that a storage shelf for storing the first support body; a first transport device for transporting the first support body from the storage shelf to a transfer position, and a second transport device for transporting the first support body from the transfer position to the storage shelf, wherein the transfer device transfers the article from the first support body located at the transfer position to the second support body.

By preferentially selecting and transferring an article in the normal orientation, articles in orientations other than the normal orientation are more likely to be left in the container. However, in the present configuration, the first support body is transported by the first transport device and the second transport device. Thus, it can be expected that the orientation of articles in orientations other than the normal orientation placed on the first supported body is changed to the normal orientation due to a vibration or a swing while the transportation is performed. Accordingly, in the case of transporting a plurality of articles from the first support body to the second support body, the ratio at which the orientation of articles is changed can be suppressed at a low level.

Also, it is preferable that the article includes a pair of reference outer faces, and the normal orientation is an orientation in which the pair of reference outer faces face in a vertical direction.

According to this configuration, in the first support body and the second support body, articles in the normal orientation are stably supported in an orientation in which the pair of reference outer faces face in the vertical direction. Accordingly, in the first support body and the second support body, the likelihood that the orientation of articles is anything other than the normal orientation can be suppressed to a low level. Accordingly, in the case of transporting a plurality of articles from the first support body to the second support body, the ratio at which the orientation of articles is changed can also be suppressed at a low level.

Also, it is preferable that the article has a rectangular-parallelepiped shape having a pair of reference outer faces, the normal orientation is an orientation in which a shortest side of three sides extending from one vertex of the article extends in a vertical direction, and the set distance is set as a distance corresponding to a length obtained by subtracting a length of the shortest side of the three sides from a length of a longest side.

According to this configuration, the normal orientation is an orientation in which the shortest side among three sides of an article extending from one vertex thereof extends in the vertical direction, and thus the center of gravity position of an article in the normal orientation can be lowered. Thus, an article in the normal orientation is unlikely to switch to an orientation (hereinafter referred to as an overturned orientation) other than the normal orientation, and an article in the overturned orientation is likely to switch to the normal orientation. In this case, if the lower face of an article in the normal orientation and the lower face of an article in the overturned orientation are located at the same position, the height of the upper face of the article in the normal orientation is lower than the height of the upper face of the article in the overturned orientation. Moreover, according to this configuration, even if the upper face of the article in the overturned orientation is located at the highest position, the article in the normal orientation with the height of the lower face being the same as, or greater than the height of the lower face of the article in the overturned orientation can be preferentially selected as a transfer-target article. Meanwhile, even in the case of articles in the normal orientation, an article in the normal orientation with the height of the lower face being smaller than the height of the lower face of an article in the overturned orientation whose upper face is located at the highest position is not selected as a transfer-target article. Accordingly, it is possible to reduce the likelihood that, when an article in the normal orientation is transferred, other articles interfere with the transferred article.

INDUSTRIAL APPLICABILITY

The technique according to the present disclosure can be used in a picking facility that transfers articles from a first support body to a second support body.

DESCRIPTION OF REFERENCE SIGNS

5: Picking robot (transfer device)
8: Image capture device
12: Picking area (transfer position)
13A: Storage shelf
15: Suction pad (holding portion)
18: First transport device
19: Second transport device
50: Article
50A: Transfer-target article
51: First container, container (first support body)
53: Second container (second support body)
100: Picking facility
H: Control device
SC: Normal orientation
T1: Upper face
Z: Height direction (vertical direction)

The invention claimed is:

1. A picking facility comprising:
   a transfer device for transferring an article from a first support body to a second support body;
   an image capture device for capturing, from above, an image of the article placed on the first support body; and
   a control device for controlling the transfer device,
   wherein the transfer device includes a holding portion for holding an upper portion of the article,
   wherein the control device performs height determination to determine a height of the article placed on the first support body, and performs orientation determination to determine whether or not an orientation of the article placed on the first support body is a normal orientation, based on image capture information from the image capture device,
   of a plurality of the articles supported by the first support body, the article located at a highest position and the article whose upper face is present in a range of a set distance downward from an upper face of the article located at the highest position are set as transfer-target articles, and
   wherein the control device performs a selection control to preferentially select, from the transfer-target articles, a transfer-target article in the normal orientation, and performs a transfer control to control the transfer device so as to transfer the transfer-target article selected through the selection control from the first support body to the second support body.

2. The picking facility according to claim 1,
   wherein, in the selection control, if there are a plurality of the transfer-target articles in the normal orientation, the control device preferentially selects, from the plurality of transfer-target articles a transfer-target article located at a highest position.

3. The picking facility according to claim 1 or 2, further comprising:
   a storage shelf for storing the first support body;
   a first transport device for transporting the first support body from the storage shelf to a transfer position, and
   a second transport device for transporting the first support body from the transfer position to the storage shelf, and
   wherein the transfer device transfers the article from the first support body located at the transfer position to the second support body.

4. The picking facility according to claim 1,
   wherein the article includes a pair of reference outer faces, and
   wherein the normal orientation is an orientation in which the pair of reference outer faces face in a vertical direction.

5. The picking facility according to claim 1,
   wherein the article has a rectangular-parallelepiped shape having a pair of reference outer faces, wherein the normal orientation is an orientation in which a shortest side of three sides extending from one vertex of the article extends in a vertical direction, and wherein the set distance is set as a distance corresponding to a length obtained by subtracting a length of the shortest side of the three sides from a length of a longest side.

6. The picking facility according to claim 2, further comprising:

a storage shelf for storing the first support body;

a first transport device for transporting the first support body from the storage shelf to a transfer position, and a second transport device for transporting the first support body from the transfer position to the storage shelf, and wherein the transfer device transfers the article from the first support body located at the transfer position to the second support body.

7. The picking facility according to claim 2, wherein the article includes a pair of reference outer faces, and wherein the normal orientation is an orientation in which the pair of reference outer faces face in a vertical direction.

8. The picking facility according to claim 3, wherein the article includes a pair of reference outer faces, and wherein the normal orientation is an orientation in which the pair of reference outer faces face in a vertical direction.

9. The picking facility according to claim 2, wherein the article has a rectangular-parallelepiped shape having a pair of reference outer faces, wherein the normal orientation is an orientation in which a shortest side of three sides extending from one vertex of the article extends in a vertical direction, and wherein the set distance is set as a distance corresponding to a length obtained by subtracting a length of the shortest side of the three sides from a length of a longest side.

10. The picking facility according to claim 3, wherein the article has a rectangular-parallelepiped shape having a pair of reference outer faces, wherein the normal orientation is an orientation in which a shortest side of three sides extending from one vertex of the article extends in a vertical direction, and wherein the set distance is set as a distance corresponding to a length obtained by subtracting a length of the shortest side of the three sides from a length of a longest side.

11. The picking facility according to claim 4, wherein the article has a rectangular-parallelepiped shape having a pair of reference outer faces, wherein the normal orientation is an orientation in which a shortest side of three sides extending from one vertex of the article extends in a vertical direction, and wherein the set distance is set as a distance corresponding to a length obtained by subtracting a length of the shortest side of the three sides from a length of a longest side.

\* \* \* \* \*

UNITED STATES PATENT AND TRADEMARK OFFICE
CERTIFICATE OF CORRECTION

PATENT NO. : 11,629,017 B2
APPLICATION NO. : 17/049655
DATED : April 18, 2023
INVENTOR(S) : Takuya Gondoh et al.

It is certified that error appears in the above-identified patent and that said Letters Patent is hereby corrected as shown below:

In the Claims

Column 18, Line 49, Claim 3, delete "1 or 2," and insert -- 1, --

Signed and Sealed this
Thirteenth Day of June, 2023

*Katherine Kelly Vidal*

Katherine Kelly Vidal
*Director of the United States Patent and Trademark Office*